(12) United States Patent
Hoffmann et al.

(10) Patent No.: US 8,408,885 B2
(45) Date of Patent: Apr. 2, 2013

(54) WASHER FLUID PUMP FOR A WINDOW CLEANING SYSTEM OF A MOTOR VEHICLE

(75) Inventors: Heinrich Hoffmann, Heringen (DE); Patrick Opel, Rotenburg (DE); Thomas Werner, Nentershausen (DE)

(73) Assignee: Continental Automotive GmbH, Hannover (DE)

( * ) Notice: Subject to any disclaimer, the term of this patent is extended or adjusted under 35 U.S.C. 154(b) by 716 days.

(21) Appl. No.: 12/065,949

(22) PCT Filed: Aug. 30, 2006

(86) PCT No.: PCT/EP2006/065820
§ 371 (c)(1),
(2), (4) Date: Mar. 6, 2008

(87) PCT Pub. No.: WO2007/031404
PCT Pub. Date: Mar. 22, 2007

(65) Prior Publication Data
US 2008/0219858 A1   Sep. 11, 2008

(30) Foreign Application Priority Data

Sep. 12, 2005 (DE) .......................... 10 2005 043 561

(51) Int. Cl.
*F04B 35/04* (2006.01)
(52) U.S. Cl. ............... 417/423.14; 417/435; 310/88; 310/59
(58) Field of Classification Search ................. 417/435, 417/410.1, 423.14, 423.9, 423.11; 310/88, 310/89, 52, 58, 59
See application file for complete search history.

(56) References Cited

U.S. PATENT DOCUMENTS

| | | | | |
|---|---|---|---|---|
| 3,576,380 A | * | 4/1971 | Sargeant | 417/423.11 |
| 4,477,229 A | * | 10/1984 | Kropiwnicki et al. | 417/53 |
| 4,872,398 A | * | 10/1989 | Shen | 454/346 |
| 5,053,633 A | * | 10/1991 | Sugiyama et al. | 290/48 |
| 5,167,578 A | * | 12/1992 | Legault | 454/350 |
| 5,372,308 A | * | 12/1994 | Egner-Walter et al. | 239/284.1 |
| 5,421,776 A | * | 6/1995 | Sakamoto et al. | 454/368 |
| 5,692,955 A | * | 12/1997 | Meyer | 454/354 |
| 5,747,904 A | * | 5/1998 | Sudhoff et al. | 310/88 |
| 5,967,764 A | * | 10/1999 | Booth et al. | 417/423.8 |
| 6,015,276 A | * | 1/2000 | Ponziani | 417/423.14 |
| 6,053,708 A | * | 4/2000 | Nishikawa | 417/360 |
| 6,109,891 A | | 8/2000 | Sato | 417/423.14 |

(Continued)

FOREIGN PATENT DOCUMENTS

DE   44 12 210 A1   12/1994
DE   19846755 A1   4/1999

(Continued)

*Primary Examiner* — Charles Freay
*Assistant Examiner* — Joseph Herrmann
(74) *Attorney, Agent, or Firm* — King & Spalding L.L.P.

(57) ABSTRACT

A washer fluid pump (2) for a window cleaning system includes two ventilation openings (13, 14) arranged in a housing (5) and linked with a single opening (15) arranged on the inside. A ventilation duct (18) has two sections (16, 17) arranged tangentially to the housing (5). The ventilation openings (13, 14) are separated from each other by a partition (19). This design makes it possible for the housing (5) to have a large ventilation cross section and avoids splashed water penetrating the housing (5).

12 Claims, 1 Drawing Sheet

U.S. PATENT DOCUMENTS

| | | | |
|---|---|---|---|
| 6,499,963 B2 * | 12/2002 | Repple et al. | 417/292 |
| 6,524,085 B2 | 2/2003 | Shoda et al. | 417/423.14 |
| 6,616,425 B2 | 9/2003 | Kober | 417/423.14 |
| 6,894,409 B2 * | 5/2005 | Bostwick et al. | 310/58 |
| 6,920,959 B2 * | 7/2005 | Han et al. | 181/224 |
| 7,157,818 B2 * | 1/2007 | Jones | 310/63 |
| 2002/0001528 A1 | 1/2002 | Shoda et al. | 417/360 |
| 2002/0085934 A1 * | 7/2002 | Kober | 417/421 |
| 2005/0104459 A1 * | 5/2005 | Jones | 310/63 |

FOREIGN PATENT DOCUMENTS

| | | |
|---|---|---|
| DE | 10061013 A1 | 7/2002 |
| DE | 199 07 561 B4 | 3/2005 |
| EP | 0466888 A1 | 1/1992 |
| EP | 1 167 774 A2 | 1/2002 |
| GB | 2 276 987 A | 10/1994 |
| JP | 2-49657 U | 4/1990 |
| JP | 2004-251287 | 9/2004 |

* cited by examiner

US 8,408,885 B2

WASHER FLUID PUMP FOR A WINDOW CLEANING SYSTEM OF A MOTOR VEHICLE

CROSS-REFERENCE TO RELATED APPLICATION

This application is a U.S. national stage application of International Application No. PCT/EP2006/065820 filed Aug. 30, 2006, which designates the United States of America, and claims priority to German application number 10 2005 043 561.0 filed Sep. 12, 2005, the contents of which are hereby incorporated by reference in their entirety.

TECHNICAL FIELD

The invention relates to a washer fluid pump for a window cleaning system of a motor vehicle having a housing with an electromotive drive which is arranged in the housing, having a pump unit which can be driven by the electromotive drive, and having a ventilation opening which is arranged in the housing.

BACKGROUND

In modern window cleaning systems, washer fluid pumps of said type are often mounted on a washer fluid container and are known from practice. The ventilation opening serves for acclimatization and pressure equalization of the housing which has the electromotive drive, and in the known washer fluid pumps, is usually embodied as an open end of a ventilation duct which leads straight through the housing. Here, the ventilation opening must be large enough to permit an infiltration of air into the housing and out of the housing. An excessively small ventilation opening tends to become blocked, which often leads to a pressure build-up and to damage of sealing elements between the electromotive drive and the pump unit. An excessively small ventilation opening therefore leads to failure of the washer fluid pump. In addition, in the event of leakage of the pump unit, liquid must be discharged through the ventilation opening in order to avoid corrosion in the electromotive drive. An excessively large ventilation opening, however, leads to an infiltration of spray water and therefore to corrosion in the electromotive drive. Corrosion of said type likewise leads to failure of the washer fluid pump.

SUMMARY

A washer fluid pump of the type specified in the introduction can be refined in such a way as to permit a sufficient pressure equalization and acclimatization and in such a way that an infiltration of spray water into the electromotive drive is largely prevented. According to an embodiment, a washer fluid pump for a window cleaning system of a motor vehicle may comprise a housing with an electromotive drive which is arranged in the housing, a pump unit which can be driven by the electromotive drive, and a ventilation opening which is arranged in the housing, wherein an opening which is arranged on the inner side of the housing is offset or inclined with respect to the ventilation opening.

According to a further embodiment, a ventilation duct may lead from the opening which is arranged on the inner side of the housing to the ventilation opening, and the ventilation opening may adjoin a bulkhead which at least partially covers the ventilation duct. According to a further embodiment, the ventilation duct may have a section which is arranged tangentially with respect to a curved partial region of the housing. According to a further embodiment, the bulkhead may cover the ventilation duct in a central region. According to a further embodiment, a single ventilation duct may lead to two ventilation openings, and the bulkhead may be arranged between the ventilation openings.

BRIEF DESCRIPTION OF THE DRAWINGS

The invention permits numerous embodiments. In order to further clarify its basic principle, one of said embodiments is illustrated in the drawing and described below. In the drawing.

DETAILED DESCRIPTION

By means of the various embodiments as described above, the ventilation duct is embodied in the manner of a labyrinth. Spray water therefore cannot penetrate directly from the ventilation opening to the opening, which is arranged on the inner side of the housing, to the electromotive drive. The opening and the ventilation opening can therefore have a very large cross section in order to ensure a sufficient pressure equalization and acclimatization. In addition, by means of the design of the housing according to an embodiment, liquid which has accumulated in the electromotive drive can be discharged unhindered. The infiltration of spray water into the electromotive drive is however intensely hindered. Undesired corrosion of the electromotive drive is thereby largely prevented.

A further reduction of the penetration of spray water to the electromotive drive is contributed to, according to another embodiment, if a ventilation duct leads from the opening which is arranged on the inner side of the housing to the ventilation opening, and if the ventilation opening adjoins a bulkhead which at least partially covers the ventilation duct. By means of this design, the ventilation duct is angled by the bulkhead.

The housing of the washer fluid pump usually has a round cross section or is delimited by a radius. Here, according to another embodiment, the ventilation duct can be produced in a particularly simple manner if the ventilation duct has a section which is arranged tangentially with respect to a curved partial region of the housing.

A particularly high level of protection of the electromotive drive from spray water can be obtained in a simple manner according to another embodiment if the bulkhead covers the ventilation duct in a central region.

A further increase in the level of protection of the electromotive drive from spray water in the case of a large overall cross section of the ventilator is contributed to, according to another embodiment, if a single ventilation duct leads to two ventilation openings, and if the bulkhead is arranged between the ventilation openings. The ventilation openings preferably may form the ends of that section of the ventilation duct which is arranged tangentially with respect to the curved partial region of the housing.

Figure 1:
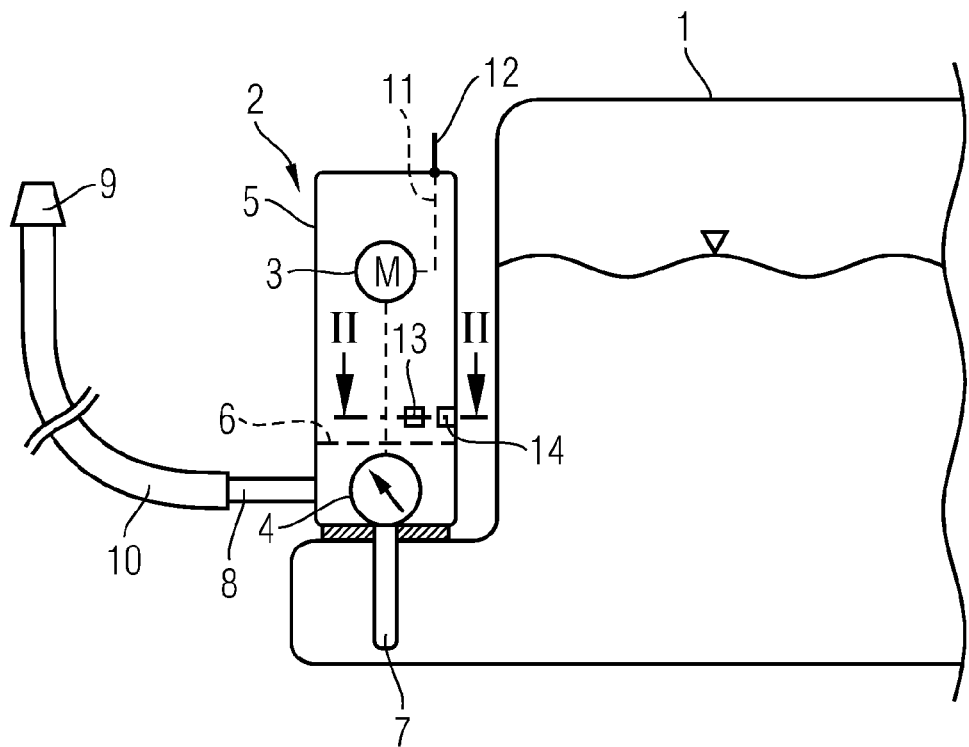
FIG. 1 schematically shows a washer fluid pump according to an embodiment mounted on a washer fluid container.

FIG. 1 shows a washer fluid pump 2, mounted on a washer fluid container 1, having an electromotive drive 3 and a pump stage 4. The electromotive drive 3 and the pump stage 4 are arranged in a common housing 5. A partition 6 within the housing 5 separates the pump stage 4 from the electromotive drive 3. The pump stage 4 has a suction pipe 7 which extends into the washer fluid container 1 and a connecting pipe 8 for connecting a washer fluid line 10 which leads to a washer nozzle 9. The electromotive drive 3 is connected by means of an electrical line 11 to connecting terminals 12 which are arranged on the housing 5. When the electromotive drive 3 is supplied with electrical current, the pump stage 4 is driven and sucks washer fluid from the washer fluid container 1 and feeds said washer fluid via the washer fluid line 10 to the washer nozzle 9. The housing 5 has two ventilation openings 13, 14 on the side of the electromotive drive 3 as viewed from the partition 6. Said ventilation openings 13, 14 permit a pressure equalization of the electromotive drive 3 with the environment.

Figure 2:
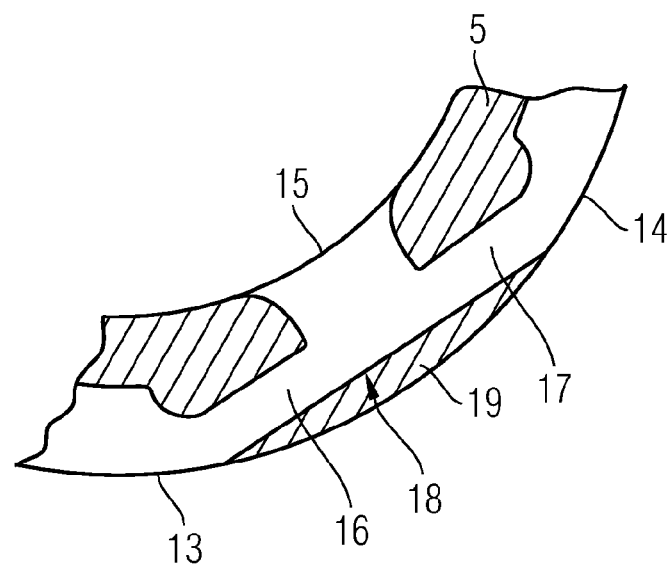
FIG. 2 shows a greatly enlarged section illustration through the washer fluid pump according to the embodiment from FIG. 1 in the region of ventilation openings, along the line II-II.

FIG. 2 shows a greatly enlarged section illustration through the housing 5 from FIG. 1 along the line II-II in the region of the ventilation openings 13, 14. Here, it can be seen that an opening 15 which is arranged on the inner side of the housing 5 is connected to the two ventilation openings 13, 14 by means of sections 16, 17, which are arranged tangentially with respect to a curved partial region of the housing 5, of a ventilation duct 18. Arranged between the two ventilation openings 13, 14 is a bulkhead 19 which covers the opening 15 arranged on the inner side of the housing 5, and therefore the central region of the ventilation duct 18.

What is claimed is:

1. A washer fluid pump for a window cleaning system of a motor vehicle comprising:
    a housing with an electromotive drive which is arranged in the housing,
    a washer fluid pump unit which can be driven by the electromotive drive,
    an inner opening which is arranged on the inner side of the housing,
    a ventilation duct leading from the inner opening and terminating at a first end at a first ventilation opening in the housing and at a second end at a second ventilation opening in the housing, the ventilation duct defining a direct, constant-shape, generally straight-line passage extending from the first ventilation opening to the second ventilation opening in a direction substantially perpendicular to a radius of the housing and perpendicular to an axial length of the housing and allowing fluid flow from the first ventilation opening to the second ventilation opening, and
    a bulkhead positioned radially outward from the ventilation duct such that the bulkhead at least partially covers the ventilation duct,
    wherein an exterior of the housing defines a convex outer surface facing radially outward, and
    wherein the bulkhead has a convex outer surface facing radially outward that matches and forms a portion of the convex outer surface defined by the exterior of the housing, and an inner surface facing radially inward that defines a wall of the ventilation duct.

2. The washer fluid pump according to claim 1, wherein the ventilation duct has a section which is arranged tangentially with respect to the convex outer surface of the housing.

3. The washer fluid pump according to claim 1, wherein the bulkhead covers the ventilation duct in a central region.

4. The washer fluid pump according to claim 1, wherein the bulkhead is arranged between the ventilation openings.

5. A washer fluid pump for a window cleaning system of a motor vehicle comprising:
    a housing with an electromotive drive arranged in the housing,
    a washer fluid pump unit driven by the electromotive drive,
    an inner opening arranged on the inner side of the housing,
    a passive ventilation duct leading from the inner opening and terminating at a first end at a first ventilation opening in the housing and at a second end at a second ventilation opening in the housing, the ventilation duct defining a direct, fixed, constant-shape passage extending from the first ventilation opening to the second ventilation opening and allowing fluid flow from the first ventilation opening to the second ventilation opening, and
    a bulkhead at least partially covering the ventilation duct,
    wherein the housing defines a convex outer surface, and the bulkhead has a convex outer surface that matches the convex outer surface defined by the housing, and
    wherein the direct passage defines a direct, unobstructed straight-line chord extending through the convex outer surface of the housing from the first ventilation opening to the second ventilation opening in a direction substantially perpendicular to a radius of the housing.

6. The washer fluid pump according to claim 5, wherein the ventilation duct has a section which is arranged tangentially with respect to the convex outer surface of the housing.

7. The washer fluid pump according to claim 5, wherein the bulkhead covers the ventilation duct in a central region.

8. The washer fluid pump according to claim 5, wherein the bulkhead is arranged between the ventilation openings.

9. A method of operating a washer fluid pump for a window cleaning system of a motor vehicle comprising the steps of:
    arranging an electromotive drive in a housing,
    driving a washer fluid pump unit by the electromotive drive,
    providing an inner opening on the inner side of the housing, and
    providing a passive ventilation duct leading from the inner opening and terminating at a first end at a first ventilation opening in the housing and at a second end at a second ventilation opening in the housing, the ventilation duct defining a direct, fixed, straight-line passage extending from the first ventilation opening to the second ventilation opening in a direction substantially perpendicular to a radius of the housing and perpendicular to an axial length of the housing and to allow fluid flow from the first ventilation opening to the second ventilation opening, and a bulkhead positioned radially outward from the ventilation duct such that the bulkhead at least partially covers the direct, straight-line passage of the ventilation duct,
    wherein the housing defines a convex outer surface, and the bulkhead has a convex outer surface that matches the convex outer surface defined by the housing. pg,11

10. The method according to claim 9, further comprising the step of arranging a section of the ventilation duct tangentially with respect to the convex outer surface of the housing.

11. The method according to claim 9, further comprising the step of covering the ventilation duct by the bulkhead in a central region.

12. The method according to claim 9, wherein the bulkhead is arranged between the ventilation openings.

* * * * *